Figure 1:
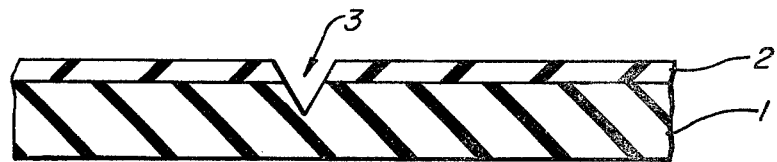

United States Patent [19]

Faber et al.

[11] 4,409,270
[45] Oct. 11, 1983

[54] METHOD FOR REPAIRING GLASS FIBER REINFORCED PLASTIC PARTS AND PRODUCT

[75] Inventors: Dolan D. Faber, Akron; Richard G. Holmes, Wadsworth; Joseph J. Varano, Hartville, all of Ohio

[73] Assignee: The General Tire & Rubber Company, Akron, Ohio

[21] Appl. No.: 370,873

[22] Filed: Apr. 22, 1982

[51] Int. Cl.³ .............................................. B32B 3/26
[52] U.S. Cl. ....................................... 428/63; 156/94; 156/98; 264/36; 264/134; 264/255; 264/296; 427/140; 428/411; 428/413; 428/423.7; 428/424.4; 428/482; 428/520; 428/522
[58] Field of Search .................... 427/140, 370, 393.5; 264/36, 134, 255, 296; 428/60, 63, 411, 423.7, 482, 413, 520, 522, 424.4; 156/94, 98

[56] References Cited

U.S. PATENT DOCUMENTS

| | | | |
|---|---|---|---|
| 4,081,578 | 3/1978 | van Essen et al. | 264/255 |
| 4,189,517 | 2/1980 | Shanoski et al. | 264/255 |
| 4,208,456 | 6/1980 | Holmes | 156/94 |
| 4,235,952 | 11/1980 | Holmes et al. | 427/140 |
| 4,239,796 | 12/1980 | Shanoski et al. | 264/255 |
| 4,239,808 | 12/1980 | Arnason | 264/255 |
| 4,242,415 | 12/1980 | Feltzin et al. | 264/255 |
| 4,245,006 | 1/1981 | Shanoski et al. | 264/255 |
| 4,331,735 | 5/1982 | Shanoski | 428/423.7 |

FOREIGN PATENT DOCUMENTS 39588  11/1981  European Pat. Off. ............ 264/255

*Primary Examiner*—Sadie L. Childs

[57] ABSTRACT

Surface defects in a cured, molded thermoset fiberglass reinforced (FRP) part can be repaired by filling the defect or void with an excess of a thermosetting conductive repair material, applying pressure and heat sufficient to cure said material without substantial shrinkage of said material, removing the pressure, cooling and finishing said parts to the original surface contour.

16 Claims, 5 Drawing Figures

METHOD FOR REPAIRING GLASS FIBER REINFORCED PLASTIC PARTS AND PRODUCT

This invention relates to a method for repairing glass fiber reinforced thermoset plastic parts which may contain an in-mold coating.

BACKGROUND OF THE INVENTION

During the process of molding and of handling of fiberglass reinforced thermoset plastic parts (FRPs) surface defects may occur because a piece of dirt or flash may have gotten into the mold, incomplete curing, scratches, cracks, because the part may have been dropped, or because a tool may have accidentally fallen on the part and the like. These problems can occur not only on the original molded FRP part but also during and after in-mold coating the FRP where also incomplete coverage of the substrate may have occurred. These problems become serious when the part is to be electrostatically coated or painted, especially where the part is to be mounted on a vehicle chassis prior to electrostatically painting.

OBJECTS

An object of the present invention is to provide a method or process for the repair of FRP parts, particularly those which will be subsequently electrostatically coated.

Another object of this invention is to provide an FRP part which has been repaired to cover surface defects and particularly a part which subsequently is to be electrostatically painted.

These and other objects and advantages of the present invention will become more apparent to those skilled in the art from the following detailed description, example and accompanying drawings.

SUMMARY OF THE INVENTION

According to the present invention a method is provided for repairing surface defects on FRP parts, which may have been in-mold coated, using as a repair material a thermosetting composition of a polymerizable acrylated urethane based oligomer, acrylated epoxy based oligomer or unsaturated polyester based oligomer which composition is electrically conductive. The repair materials can be used to repair thermoset FRP (unsaturated polyester-styrene-glass fiber) parts which may or may not have been in-mold coated with isocyanate based in-mold coatings or non-isocyanate based in-mold coatings. The FRP substrate may or may not be electrically conductive, and the in-mold coating on the surface of the FRP part may or may not be electrically conductive.

This repair material when cured has good sandability and also retains its original volume after several oven bake cycles including those used for curing cathodic electrocoat primers (very low shrinkage). This material does not require additional priming before electrostatic painting operations can be done. Many of the common paint systems presently in use in the automotive finishing industry adhere and perform excellently over the repaired areas. This repair material can be coated over itself in multiple applications with no adverse effects. This repair material is useful primarily for cosmetic repairs and not structural type repair; also the repair material can withstand the 400° F.+temperatures required to cure the electro-coat dip primers now used in the automotive industry. For example, as a conductive repair system, this material is processable through automotive ELPO and E coat oven cycles.

Figure 2:
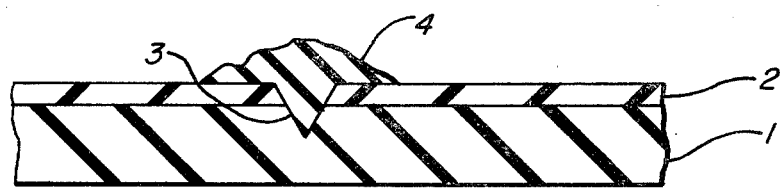
Figure 3:
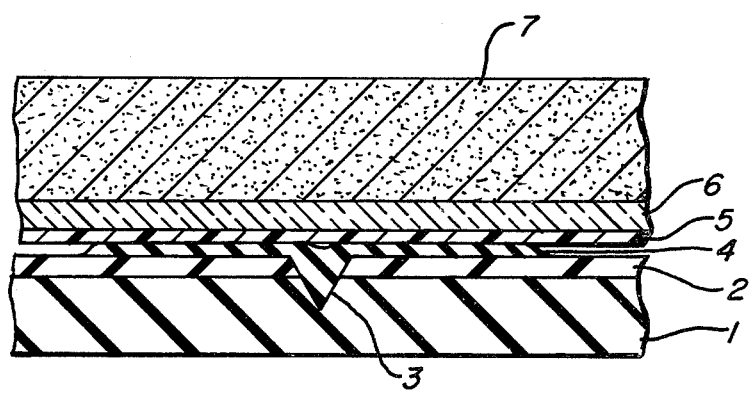
Figure 4:
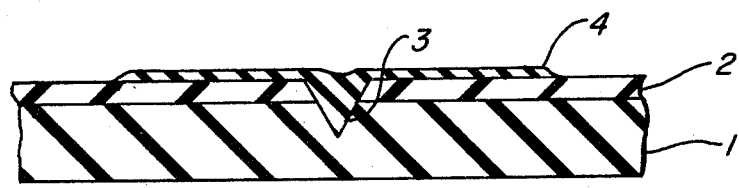
Figure 5:
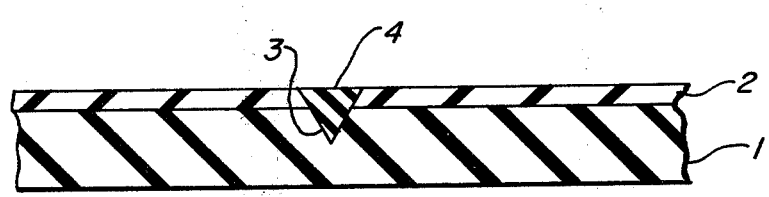

As shown in the accompanying drawings:

FIG. 1 is a cross section of FRP molding 1 containing in-mold coating layer 2 with void or defect 3;

FIG. 2 is a cross section of FRP molding 1 containing repair material 4 applied to and filling void or defect 3 and covering a portion of the surface of in-mold coating layer 2;

FIG. 3 is a cross section of FRP molding 1 wherein a MYLAR or other inert or non reactive film 5 has been placed over repair material 4. Heating mantel 6 has been placed over MYLAR film 5 and pressure has been applied to heating mantel 6 by means of sandbag or other pressure applying and shape conforming means, e.g., an air cylinder and piston with a conforming pad which may contain an inert surface layer or coating, 7 to cause the spreading out of and the curing of repair material 4 on in-mold coating layer 2 and in void 3;

FIG. 4 is a cross section of FRP molding 1 after curing of repair material 4 and after removal of MYLAR film 5, heating mantel 6 and sandbag 7 and FIG. 5 is a cross section of FRP molding 1 containing in-mold coating 2 wherein the surface has been sanded or otherwise treated to remove excess repair material 4 from the surface of in-mold coating 2 but to leave void 3 filled with cured repair material 4. The sanding, also, conforms the repair material to the original contour of the substrate or FRP part. While there has been disclosed an inert film, a heating mantel and a pressure applying device such as a pad, it is apparent that these elements could all be incorporated into one apparatus having a flexible outer inert or non reactive (non adhesive) layer on a flexible heating mantel which is connected to or is part of a pressure applying device such as an air inflatable or pressurizable pad.

DISCUSSION OF DETAILS AND PREFERRED EMBODIMENTS

The polymerizable or crosslinkable diacrylate terminated polyurethane oligomer may be a polyesterurethane diacrylate, a polyetherurethane diacrylate or a polyesteretherurethane diacrylate or other polyurethane oligomer having more than two acrylate groups. These materials may be made by reacting a polyetherdiol (e.g., a polypropylene ether diol), polyesterdiol (e.g., a polyethylene adipate diol) and/or a polyetherester diol (e.g., a polypropylene ether adipate diol), or triol etc., and so forth with a diisocyanate like tolylene diisocyanate, 4,4'-diphenylmethane diisocyanate, hexamethylene diisocyanate and the like an an amount sufficient to form an isocyanate terminated polyurethane prepolymer which is then reacted with hydroxyl propyl acrylate, hydroxy ethyl acrylate, hydroxy ethyl methacrylate and so forth to form the diacrylate terminated polyurethane oligomer or polymer. Mixtures of these acrylate terminated polyurethane oligomers may be used. The term "acrylate" as used here is intended to cover methacrylate and ethacrylates as well as acrylates. Of these materials it is preferred to use a diacrylate polyesterurethane oligomer. Acrylate terminated polyurethane oligomers, e.g., curable by light, ultraviolet, electric beam and/or infrared and so forth, are well known, and sometimes are referred to as irradiation or radiation curable materials.

The epoxy based oligomer having at least two acrylate (or methacrylate or ethacrylate) groups is prepared by reacting acrylic acid, methacrylic acid or ethacrylic acid and so forth with an epoxy based oligomer or resin such as a Bisphenol A epoxy, a tetrabromo Bisphenol A epoxy, phenolic novolak epoxy, tetraphenylolethane, epoxy, dicycloaliphatic epoxy and so forth. Mixtures of these epoxy based oligomers may be used. Of these materials it is preferred to use a diacrylate terminated Bisphenol A epoxy oligomer. These materials are well known. For more information on these materials see "Heat Resistant Vinyl Ester Resin," M. B. Launikitis, Technical Bulletin, SC:116-76, Shell Chemical Company, June, 1976 and Shell Chemical Company Technical Bulletins SC:16–76 and SC-:60–78.

The polyester based oligomer having a plurality of internal ethylenically unsaturated groups used may be made by copolymerizing maleic anhydride and an alkylene oxide of 2 to 4 carbon atoms such as propylene oxide, ethylene oxide, butylene oxide, isobutylene oxide and so forth and mixture thereof. Propylene oxide and mixtures of propylene oxide and ethylene oxide are preferred. The alkylene oxide may be used in a molar ratio greater than the maleic anhydride to provide a polyester which is essentially or all OH terminated, e.g., a polyester diol. Up to about 50 mol % of the maleic anhydride may be replaced with a saturated anhydride such as phthalic anhydride or other anhydride and mixture thereof. A telogen like fumaric acid, also, may be used. It is preferred to use maleic anhydride. These unsaturated polyesters may be made in benzene, styrene or other solvent using a double metal cyanide catalyst as shown in U.S. Pat. No. 3,538,043. As shown in said patent an isomerization catalyst such as piperidine is used to isomerize the maleate double bonds of the polyester to fumarate double bonds. Morpholine, also, may be used as an isomerization catalyst as shown by U.S. Pat. No. 3,576,909. These polyesters may have molecular weights of from about 800 to 2500, preferably from about 1000 to 1500. Polyesters made by reacting maleic anhyride or maleic acid, fumaric acid, itaconic acid, or citraconic acid with a glycol like propylene glycol, dipropylene glycol, 1,4-butane diol, bisphenol A and so forth including minor amounts of phthalic acid or phthalic anhydride and other diols and dicarboxylic acids may be used. The substantially aliphatic polyesters like the fumarate polyesters made using the double metal cyanide catalysts as described above are preferable to use. For more information on making unsaturated polyesters see "Encyclopedia of Polymer Science And Technology," Interscience Publishers, a division of John Wiley & Sons, Inc., New York, Vol. 11, 1969, pages 129 to 168.

It is preferred to use the diacrylate terminated polyurethane oligomer or the diacrylate terminated epoxy based oligomer.

An organic free-radical or free radical generating initiator (catalyst) such as a peroxide is used to catalyze the copolymerization or crosslinking of the ethylenically unsaturated oligomer and the other ethylenically unsaturated materials. Examples of free-radical initiators include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(-benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and the like and mixtures thereof. It is desirable sometimes to use mixtures of initiators to take advantage of their different decomposition rates and times at different temperatures and so forth. A preferred initiator to use is tertiary butyl perbenzoate. The peroxide initiator should be used in an amount sufficient to overcome the effect of the inhibitor and to cause crosslinking or curing of the ethylenically unsaturated materials. In general the peroxide initiator may be used in an amount of up to about 5%, preferably up to about 2%, by weight based on the weight of the ethylenically unsaturated materials employed in the repair material.

An accelerator is used for the peroxide initiator and is a material such as a drier, e.g., cobalt octoate. Other materials which may be used are zinc naphthenate, lead naphthenate, cobalt naphthenate and manganese naphthenate. Soluble Co, Mn and Pb salts of linoleic acid, also, may be used. Only small amounts by weight of the accelerator need be used. In general the accelerator is used in an amount of from about 0.05 to 2 parts by weight per 100 parts by weight of the polymerizable oligomer.

A minor amount by weight of a zinc salt of a fatty acid having at least 10 carbon atoms, also, is employed in the repair material or repair composition and appears to function as a release agent and as a secondary accelerator for the cure. Fatty acids are well known. See "Organic Chemistry," Fieser and Fieser, D. C. Heath and Company, Boston, 1944, pages 88, 381–390, 398 and 401 and "Hackh's Chemical Dictionary," Grant, McGraw Hill Book Company, New York, 1969, page 261. Mixtures of zinc salts of the fatty acids can be used. Examples of some zinc salts are zinc palmitate, zinc stearate, zinc ricinoleate and the like. It is preferred to use the zinc salt of a saturated fatty acid such as zinc stearate. See, also, "Whittington's Dictionary Of Plastics," Whittington, Technomic Publishing Co., Inc., Stamford, Conn., 1968, pages 35, 102 and 261. The zinc salt generally is used in an amount such as from about 0.2 to 5 parts by weight per 100 parts by weight of the polymerizable oligomer.

Small amounts by weight of a calcium salt of a fatty acid having at least 10 carbon atoms, e.g., from about 0.2 to 5 parts by weight of calcium salt per 100 parts by weight of the polymerizable oligomer, are used in the repair material as a release agent and to control the rate of the cure. Fatty acids are well known as shown above. Mixtures of calcium salts of the fatty acids can be used. Examples of some calcium salts are calcium stearate, calcium palmitate, calcium oleate and the like. It is preferred to use the calcium salt of a saturated fatty acid like calcium stearate.

Polyvinyl acetate is employed as a low-shrink or low profile additive in the repair material. It, also, improves paint adhesion. The polyvinyl acetate is employed in a minor amount by weight as compared to the total weight of the ethylenically unsaturated materials in the repair material or repair composition and sufficient for future paint adhesion. In general the polyvinyl acetate is employed in an amount of from about 30 to 80 parts by weight per 100 parts by weight of the polymerizable oligomer.

A copolymerizable ethylenically unsaturated monomer is used in an amount at least sufficient to copolymerize with and to crosslink the polymerizable oligomer and includes styrene (preferred), alpha methyl styrene, vinyl toluene, t-butyl styrene, chlorostyrene, methyl methacrylate, diallyl phthalate (with styrene or methyl methacrylate and the like), triallyl cyanurate, triallyl isocyanurate, divinyl benzene, methyl acrylate and so forth and mixtures thereof. The unsaturated monomer is used generally in a total amount of from about 80 to 150 parts by weight per 100 parts by weight of the polymerizable oligomer.

There, also, is used in the repair material for further copolymerization and crosslinking and to improve hardness of the resulting coating a mono ethylenically unsaturated compound having a —CO— group and having a —$NH_2$, —NH— and/or —OH group. Examples of such monomeric compounds are hydroxyl propyl methacrylate (preferred), hydroxyethyl methacrylate, hydroxy ethyl acrylate, hydroxy ethyl crotonate, hydroxypropyl acrylate, hydroxy polyoxypropylene acrylate, hydroxy polyoxypropylene methacrylate, hydroxy polyoxyethylene methacrylate, acrylamide, methacrylamide, N-hydroxymethyl acrylamide, N-hydroxymethyl methacrylamide and so forth and mixtures of the same. These compounds generally may be used in an amount of from about 20 to 120 parts by weight per 100 parts by weight of the polymerizable oligomer.

There, further, is used a liquid copolymerizable or crosslinkable acrylate compound having from 2 to 4 vinyl groups, being free of urethane, cycloaliphatic and aromatic groups and having an average molecular weight of up to about 1500. Examples of such compounds include trimethylol propane trimethacrylate, trimethylol propane triacrylate, pentaerythritol tetracrylate, triethylene glycol diacrylate, tetraethylene glycol diacrylate, tetraethylene glycol dimethacrylate, 1,3-butylene glycol diacrylate, polyethylene glycol diacrylate, polypropylene glycol diacrylate, polyethylene glycol dimethacrylate or polyoxyethylene glycol dimethacrylate (preferred), pentaerythritol triacrylate, 1,6-hexanediol diacrylate, polypropylene glycol dimethacrylate, polyethylene propylene glycol diacrylate, and so forth and mixtures thereof. Since some of these reactive polyfunctional monomers may be made by reacting unsaturated acids and alcohols, they may contain some OH and/or COOH groups. The reactive polyfunctional monomers may be used generally in an amount of from about 20 to 120 parts by weight per 100 parts by weight of the polymerizable oligomer.

The unsaturated materials mentioned above, thus, are used in an amount sufficient to provide on cure (e.g., polymerization, copolymerization and/or crosslinking) a thermoset composition.

To prevent premature gelation of the ethylenically unsaturated materials and to provide for improved shelf-life or storageability inhibitors are added in the desired amount to the repair material or composition or are provided in the raw materials before use. Examples of inhibitors are hydroquinone, benzoquinone, p-t-butyl catechol and the like and mixture thereof.

The repair material additionally is filled or compounded to give the desired viscosity and flow to the composition and to afford the desired physical properties to the resulting thermoset repair material. Fillers, also, may improve adhesion. Examples of such fillers and compounding ingredients are inorganic or mineral fillers like clay, talc, MgO, $Mg(OH)_2$), $CaCO_3$ and silica, red iron oxide, $TiO_2$, carbon black including conductive carbon black, color pigments, antidegradants, U-V absorbers, calcium silicate, paraffin wax, hollow glass or resin micro-spheres, thickening agents, other low shrink additives and the like. The inorganic filler is used in an amount of from about 50 to 150 parts by weight per 100 parts by weight of the polymerizable oligomer. Talc is a preferred inorganic or mineral filler. The use of an electroconductive filler like conductive carbon black enables the coating to be painted by standard electrostatic painting techniques. Such conductive carbon black is used in an amount of from about 5 to 20 parts by weight per 100 parts by weight of the polymerizable oligomer. These fillers and compounding ingredients should be used in amounts sufficient to provide satisfactory results. However, care should be exercised in the use of high filler contents as this may give high viscosities and result in flow and handling difficulties. It is not desirable to use in the repair material or repair composition of this invention materials like carboxylated butadiene-styrene block copolymers or fatty alcohol phosphates.

For ease in handling, materials like polyvinylacetate may be dissolved in a reactive monomer like styrene. The viscosity of the oligomers may be reduced by dilution with styrene and the like. The ingredients of the repair material should be readily mixed and handled at ambient or room temperature or temperatures below the polymerization temperature so that they may be readily used for repairing FRPs. The ingredients may be warmed or heated before or during mixing and mixed in steps to facilitate thorough mixing, dispersion and solution of the same.

With the peroxide initiator or catalyst the repair material exhibits a shelf-life at room temperature (about 25° C.) of about a week, and without the initiator it exhibits a shelf life of several months at room temperature. The initiator is preferably added to the composition and thoroughly mixed therewith just before use.

All of the ingredients of the repair material or repair composition should be kept dry or have a minimal amount of moisture or the water content should be controlled to obtain reproducible results and to prevent pore formation. Mixing of the ingredients of the repair material should be thorough.

See U.S. patent application Ser. No. 316,592 filed Nov. 2, 1981 for compositions similar to the above and useful as in-mold coatings for FRPs.

With respect to molding FRP parts and in-mold coating FRP parts injection or compression, transfer molding, or other molding apparatus or machines can be used. Molding apparatus and methods may be found in U.S. Pat. Nos. 4,076,780; 4,076,788; 4,081,578; 4,082,486, 4,189,517; 4,222,929; 4,245,006, 4,239,796 and 4,239,808 and in U.S. patent applications Ser. No. 262,981 filed May 20, 1981 and Ser. No. 323,213 filed Nov. 20, 1981. Please see, also, "Proceedings of the Thirty-Second Annual Conference Reinforced Plastics/Composites Institute," SPI, Washington, February, 1977, Griffith et al., Section 2-C, pages 1-3 and "33rd Annual Technical Conference, 1978 Reinforced Plastics/Composites Institute The Society of the Plastics Industry, Inc.," SPI, Ongena, Section 14-B, pages 1-7.

The processes or methods of the present invention can be used in the repair of automobile parts such as grille and headlamp assemblies, deck hoods, fenders, door panels and roofs as well as in the repair of food trays, appliance and electrical components, furniture, machine covers and guards, bathroom components, structural panels and so forth made from FRPs. The glass fiber reinforced thermoset plastic (FRP) such as the polyester resin or vinyl ester resin and glass fiber composition substrate can be a sheet molding compound (SMC) or a bulk molding compound (BMC), or other thermosetting FRP material as well as a high strength molding compound (HMC) or a thick molding compound. The FRP substrate can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semirigid (may contain a flexibilizing moiety such as an adipate group in the polyester). The substrate, also, may contain other flexibilizing polymers, the elastomers and plastomers, such as the styrene-butadiene block copolymers. Unsaturated polyester glass fiber thermosets are known as shown by "Modern Plastics Encyclopedia," 1975-1976, October, 1975, Vol. 52, No. 10A, McGraw-Hill, Inc., New York, pages 61, 62 and 105 to 107; "Modern Plastics Encyclopedia," 1979-1980, October, 1979, Volume 56, Number 10A, pages 55, 56, 58, 147 and 148 and "Modern Plastics Encyclopedia," 1980-81, October, 1980, Volume 57, Number 10A, pages 59, 60, and 151 to 153, McGraw-Hill, Inc., New York, N.Y. For information on vinyl ester resins see the Shell Chemical Company Technical Bulletins mentioned above.

The repair materials of the present invention can give rapid cures and show good adhesion to paints.

The following example will serve to illustrate the present invention with more particularly to those skilled in the art. In the example, the parts are parts by weight unless otherwise indicated.

EXAMPLE

The gouge or defect in the surface of a cured in-mold coated (conductive coating) FRP part was cleaned out by scraping, routing, or debridement of loose substrate. The surface should be dust, grease and foreign material free by wiping, cleaning and so forth.

The repair material was then applied to the defective area in a manner to squeeze the air from the defects recessed areas. There should be an excess of the repair material over the defective area.

A piece of MYLAR film was laid over the wet repair material so that it did not entrap air between the MYLAR film and repair liquid. A heating mat or mantle capable of generating at least about 280° F. after 5 minutes of applied voltage at 67-68 volts A.C. was placed over the MYLAR film and then pressure was applied.

Pressure is very critical to this technique. It has been found that to avoid any substantial shrinkage a range of from about 26 to 50 psi is effective with from about 36 to 50 psi being better. Lower pressures below 36 psi can be used provided the repair material has been thoroughly degassed and has not been allowed to redissolve any air. The lower pressures usually are not as reliable and the subsequent repairs exhibit a tendency for greater shrinkage rates during subsequent baking operations.

The pressure was applied by means of a sandbag.

The coated part was cured under pressure and at a temperature of at least about 280° F. and up to about 415° F. for from about 5 to 20 minutes.

The pressure and heat were removed and the part was allowed to cool to room temperature (about 25° C.). The repaired area was then sanded back to the original part contour. It has been found that block sanding during the final stages is beneficial. Instead of finishing the part by sanding to return it to its original contour and remove excess repair material, grinders, cutters and other devices may be used to remove the excess or extraneous repair material care being used not to harm the surface of the FRP part.

After repairing, the defect should be difficult to feel. If there is a slight observable indication of where the defect was, this can generally be removed by standard buffing or standard finishing operations. The repaired area can now be painted or finished as desired with no further shrinkage.

Listed below are two materials which have been used to satisfactorily repair defective in-mold coated FRPs according to the method of the present invention:

| I Composition A | |
|---|---|
| Ingredient | Parts By Weight |
| LP-90 | 100.0 |
| UVITHANE 783 | 75.0 |
| CHEMLINK 600 | 25.0 |
| Hydroxypropylmethacrylate | 20.0 |
| Styrene | 10.0 |
| 2% Benzoquinone in styrene | 5.0 |
| Zinc stearate | 0.45 |
| Calcium stearate | 0.90 |
| Cobalt octoate (12% as Co in mineral oil) | 0.12 |
| VULCAN carbon black | 11.0 |
| BEAVER WHITE 200 Talc | 90.0 |

93.90 parts by weight of composition A were mixed with 1.41 parts by weight of tertiary butyl perbenzoate and 4.69 parts by weight of styrene to form repair material A-I.

| II Composition B | |
|---|---|
| Ingredient | Parts By Weight |
| LP-90 | 75.0 |
| EPOCRYL 370 | 85.0 |
| CHEMLINK 600 | 75.0 |
| Hydroxypropylmethacrylate | 30.0 |
| Styrene | 35.0 |
| 2% Benzoquinone in styrene | 5.0 |
| Zinc stearate | 0.90 |
| Calcium stearate | 0.45 |
| Cobalt octoate (12% as Co in mineral oil) | 0.12 |
| VULCAN carbon black | 11.0 |
| BEAVER WHITE 200 Talc | 80.0 |

99.76 parts by weight of composition B are mixed with 0.21 part by weight of zinc stearate, 0.03 part by weight of cobalt octoate (12% as Co in mineral oil) and 2.00 parts by weight of tertiary-butyl perbenzoate to form repair material B-II.

Repair materials A-I and B-II (as peroxide catalyzed or initiated) are stable (no gelling) for from 7 to 10 days at 70° to 80° F. If as pointed out above low pressures are used during curing of the repair material on the substrate, the repair material first should be degassed at 100° to 110° F. under 25" vacuum for about 30 minutes.

Notes For Example:

LP-90—BAKELITE LP-90—40% by weight of polyvinyl acetate in styrene, viscosity of 1,800 centipoises at 25° C. (Model LVT Brookfield viscometer #4 spindle at 60 rpm), specific gravity 20/20° C. ($H_2O=1$) of 1.008 and solidification temperature of 5° C. Union Carbide Corp.

UVITHANE 783, a polymerizable urethane based material or oligomer, a diacrylate terminated polyesterurethane prepolymer. A viscous liquid (Kg/l 1.3 at 25° C.) having a viscosity at 49° C. of 600-2000 poise and at 82° C. of 50-110 poise, having an unsaturation (equiv./100 grams) of 0.17-0.205 and having an isocyanate content (%) of 0.3 max. Thiokol/Chemical Division, Thiokol Corporation.

CHEMLINK 600 or CL 600—Polyoxyethylene glycol 600 dimethacrylate. Molecular weight of about 770. $C_{36}H_{66}O_{17}$. The Ware Chemical Corp.

VULCAN—XC-72B. N472. Conductive furnace carbon black. Cabot Corp.

Talc—hydrous magnesium silicate.

EPOCRYL 370—Non-volatile diacrylate ester of a liquid Bisphenol A epoxy resin having a viscosity, poise, 25° C. (100% resin) of 9,000; an acidity eq./100 G of 0.007; an epoxide eq./100 G of 0.02; a Gardner color of 4; a weight/volume, lb/U.S. Gal, of 9.99; a flash point, °C>204 and a viscosity, Gardner, 25° C. (80% w resin in xylene) of V-Y. Shell Chemical Co. MYLAR-Polyethylene terephthalate. duPont Co.

We claim:

1. A method for repairing a surface defect in a thermoset fiberglass reinforced polyester resin or vinyl ester resin molding comprising
   (I) filling said defect with an excess amount of a thermosetting electrically conductive repair material,
   (II) applying to said repair material heat at a temperature of from about 280° F. to 415° F. and pressure at from about 25 to 50 psi, or from about 36 to 50 psi, for a period of time sufficient to cure said repair material without substantial shrinkage,
   (III) withdrawing the heat and pressure from the part and allowing the part to cool to room temperature and
   (IV) finishing said part in the area of said defect to remove excess repair material and to return the part to its original contour, said repair material consisting essentially of
     (a) a polymerizable epoxy based oligomer having at least two acrylate groups in an amount of 100 parts by weight,
     (b) a copolymerizable ethylenically unsaturated monomer in an amount of from about 80 to 150 parts by weight,
     (c) a zinc salt of a fatty acid having at least 10 carbon atoms in an amount of from about 0.2 to 5 parts by weight,
     (d) an accelerator for an organic free radical peroxide initiator in an amount of from about 0.05 to 2 parts by weight,
     (e) polyvinyl acetate in an amount of from about 30 to 80 parts by weight,
     (f) a copolymerizable monoethylenically unsaturated compound having a —CO— group and a —$NH_2$, —NH— and/or —OH group in an amount of from about 20 to 120 parts by weight,
     (g) a copolymerizable liquid acrylate compound having from 2 to 4 vinyl groups, being free of urethane, cycloaliphatic and aromatic groups and having an average molecular weight of up to about 1500 in an amount of from about 20 to 120 parts by weight,
     (h) a calcium salt of a fatty acid having at least 10 carbon atoms in an amount of from about 0.2 to 5 parts by weight,
     (i) an inorganic filler in an amount of from about 50 to 150 parts by weight,
     (j) a conductive carbon black in an amount of from about 5 to 20 parts by weight and
     (k) an organic free radical peroxide initiator in an amount of up to about 5%, or up to about 2%, by weight based on the weight of said ethylenically unsaturated materials,
   said polymerizable and copolymerizable materials (a), (b), (f) and (g) being different from each other.

2. The method according to claim 1 where said thermoset fiberglass reinforced molding contains an in-mold coating.

3. The method according to claim 1 where there is an inert layer disposed on the surface of said repair material during the curing of said repair material and where said inert layer is removed prior to finishing.

4. The method according to claim 1 where said thermoset fiberglass reinforced molding contains an in-mold coating, where there is an inert layer disposed on the surface of said repair material during the curing of said repair material and where said inert layer is removed prior to finishing.

5. The method according to claim 1 where:
   (a) is a diacrylate ester of a liquid Bisphenol A epoxy resin,
   (b) is styrene,
   (c) is zinc stearate
   (d) is cobalt octoate,
   (f) is hydroxy propyl methacrylate,
   (g) is polyoxyethylene glycol dimethacrylate having a molecular weight of about 770,
   (h) is calcium stearate and
   (i) is talc.

6. The method according to claim 2 where:
   (a) is a diacrylate ester of a liquid Bisphenol A epoxy resin,
   (b) is styrene,
   (c) is zinc stearate
   (d) is cobalt octoate,
   (f) is hydroxy propyl methacrylate,
   (g) is polyoxyethylene glycol dimethacrylate having a molecular weight of about 770,
   (h) is calcium stearate and
   (i) is talc.

7. The method according to claim 3 where:
   (a) is a diacrylate ester of a liquid Bisphenol A epoxy resin,
   (b) is styrene,
   (c) is zinc stearate
   (d) is cobalt octoate,
   (f) is hydroxy propyl methacrylate,
   (g) is polyoxyethylene glycol dimethacrylate having a molecular weight of about 770,
   (h) is calcium stearate and
   (i) is talc.

8. The method according to claim 4 where:
   (a) is a diacrylate ester of a liquid Bisphenol A epoxy resin, (b) is styrene,
(c) is zinc stearate
(d) is cobalt octoate,
(f) is hydroxy propyl methacrylate,
(g) is polyoxyethylene glycol dimethacrylate having a molecular weight of about 770,
(h) is calcium stearate and
(i) is talc.

9. The product produced by the method of claim 1.
10. The product produced by the method of claim 2.
11. The product produced by the method of claim 3.
12. The product produced by the method of claim 4.
13. The product produced by the method of claim 5.
14. The product produced by the method of claim 6.
15. The product produced by the method of claim 7.
16. The product produced by the method of claim 8.

* * * * *